(12) United States Patent
Takata et al.

(10) Patent No.: US 11,262,257 B2
(45) Date of Patent: Mar. 1, 2022

(54) STRAIN GAUGE INCLUDING IMPROVED STABILITY OF TEMPERATURE COEFFICIENT OF RESISTANCE AND GAUGE FACTOR

(71) Applicant: MINEBEA MITSUMI Inc., Nagano (JP)

(72) Inventors: Shintaro Takata, Nagano (JP); Shinya Toda, Shizuoka (JP); Toshiaki Asakawa, Shizuoka (JP); Keiki Maeno, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 16/757,873

(22) PCT Filed: Oct. 30, 2018

(86) PCT No.: PCT/JP2018/040379
§ 371 (c)(1),
(2) Date: Apr. 21, 2020

(87) PCT Pub. No.: WO2019/088120
PCT Pub. Date: May 9, 2019

(65) Prior Publication Data
US 2020/0340870 A1 Oct. 29, 2020

(30) Foreign Application Priority Data
Oct. 31, 2017 (JP) .............................. JP2017-210573

(51) Int. Cl.
*G01L 1/22* (2006.01)

(52) U.S. Cl.
CPC .......... *G01L 1/2293* (2013.01); *G01L 1/2281* (2013.01)

(58) Field of Classification Search
None
See application file for complete search history.

(56) References Cited

U.S. PATENT DOCUMENTS

| 5,914,168 A | 6/1999 | Wakamatsu et al. |
| 2004/0140868 A1 | 7/2004 | Takeuchi et al. |

(Continued)

FOREIGN PATENT DOCUMENTS

| EP | 725392 | 8/1996 |
| JP | H06-300649 | 10/1994 |

(Continued)

OTHER PUBLICATIONS

International Search Report for PCT/JP2018/040379 dated Jan. 15, 2019.

(Continued)

*Primary Examiner* — Lisa M Caputo
*Assistant Examiner* — Nigel H Plumb
(74) *Attorney, Agent, or Firm* — IPUSA, PLLC

(57) ABSTRACT

A strain gauge includes a substrate formed of resin and having flexibility and a functional layer formed of a metal, an alloy, or a metal compound, directly on one surface of the substrate. The strain gauge includes a resistor formed as a film that contains Cr, CrN, and $Cr_2N$ and into which an element contained in the functional layer is diffused. The resistor is provided on one surface of the functional layer. A first substance having a function of controlling growth of crystal grains as a main component of the resistor, is added to the resistor.

12 Claims, 4 Drawing Sheets

(56) References Cited

U.S. PATENT DOCUMENTS

2005/0188769 A1    9/2005  Moelkner et al.
2018/0217016 A1    8/2018  Inamori et al.

FOREIGN PATENT DOCUMENTS

| | | |
|---|---|---|
| JP | H07-113697 | 5/1995 |
| JP | H08-102163 | 4/1996 |
| JP | H09-016941 | 1/1997 |
| JP | H10-270201 | 10/1998 |
| JP | 2004-072715 | 3/2004 |
| JP | 2007-173544 | 7/2007 |
| JP | 2015-031633 | 2/2015 |
| JP | 2016-074934 | 5/2016 |
| JP | 2016-136605 | 7/2016 |
| JP | 2017-067764 | 4/2017 |

OTHER PUBLICATIONS

Office Action dated Jun. 3, 2021 with respect to the corresponding Chinese Patent Application No. 201880084730.0.
Extended European Search Report dated Jun. 24, 2021 with respect to the corresponding European Patent Application No. 18874226.6.
Office Action dated Dec. 7, 2021 with respect to the corresponding Japanese patent application No. 2017-210573.

AFTER HEATED

STRAIN GAUGE INCLUDING IMPROVED STABILITY OF TEMPERATURE COEFFICIENT OF RESISTANCE AND GAUGE FACTOR

TECHNICAL FIELD

The present invention relates to a strain gauge.

BACKGROUND ART

Strain gauges that have been known are attached to an object to be measured so as to detect a strain of the object. Such a strain gauge includes a resistor for detecting a strain, and as materials of the resistor, materials containing, for example, Cr (chromium) and/or Ni (nickel) are used. Also, the resistor is formed in a predetermined pattern, for example, by etching a metal foil (see, e.g., Patent Document 1).

RELATED-ART DOCUMENTS

Patent Documents

[Patent Document 1] Japanese Unexamined Patent Application Publication No. 2016-74934

SUMMARY OF THE INVENTION

Problem to be Solved by the Invention

However, in the case of using a substrate having flexibility, it is difficult to form a stable resistor on the substrate, and there has been a problem that such a strain gauge lacks stability in the gauge characteristics, especially in the temperature coefficient of resistance TCR.

The present invention has been made in view of the above points, and has an object to improve the stability of the temperature coefficient of resistance TCR in a strain gauge.

Means for Solving the Problem

The present strain gauge includes a substrate having flexibility; and a resistor formed from a material containing at least one of chromium and nickel, on the substrate, wherein a first substance having a function of controlling growth of crystal grains as the main component of the resistor, is added to the resistor.

Advantage of the Invention

According to the disclosed technique, it is possible to improve the stability of the temperature coefficient of resistance TCR in a strain gauge.

DETAILED DESCRIPTION OF THE PREFERRED EMBODIMENTS

Figure 1:
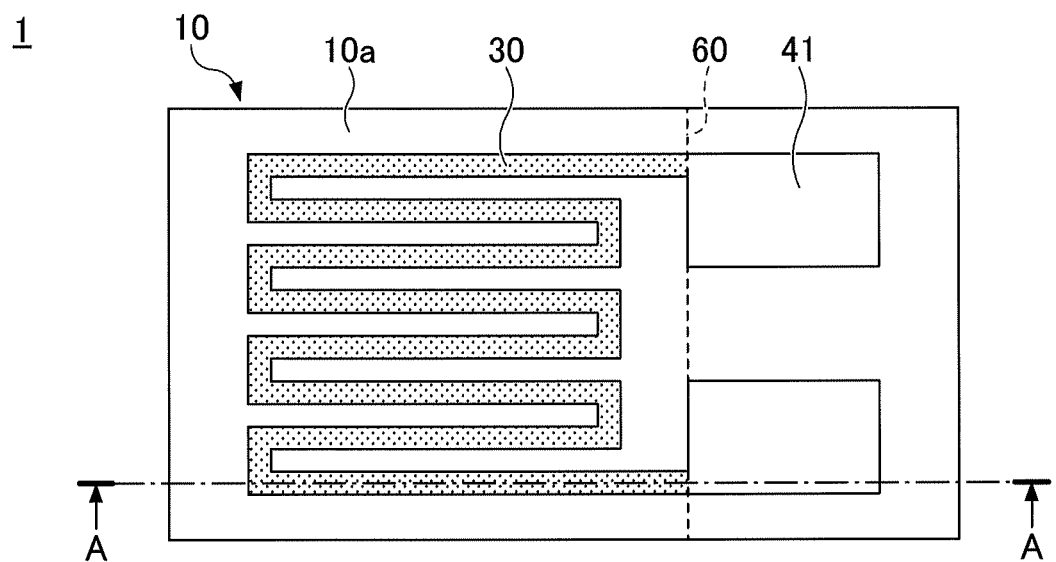
FIG. 1 is a plan view illustrating a strain gauge according to a first embodiment.

In the following, embodiments for carrying out the present invention will be described with reference to the drawings. Throughout the drawings, the same elements are assigned the same reference numerals, and duplicate description may be omitted.

First Embodiment

Figure 2:
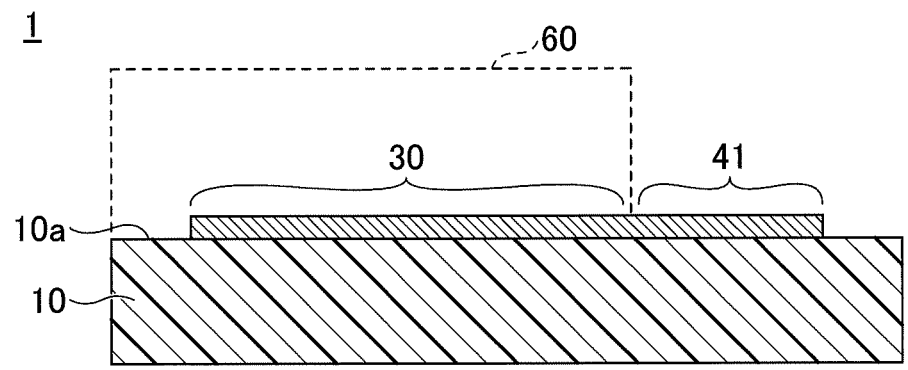
FIG. 2 is a first cross-sectional view illustrating a strain gauge according to the first embodiment.

FIG. 1 is a plan view illustrating a strain gauge according to a first embodiment. FIG. 2 is a cross-sectional view illustrating the strain gauge according to the first embodiment, which illustrates a cross section taken along a line AA in FIG. 1. Referring to FIGS. 1 and 2, a strain gauge 1 includes a substrate 10, a resistor 30, and terminal sections 41.

Note that in the present embodiment, for the sake of convenience, a side of the strain gauge 1 on which the resistor 30 of the substrate 10 is provided is defined as an upper side or one side, and another side on which the resistor 30 is not provided is defined as a lower side or the other side. Also, a surface of each part on which the resistor 30 is provided is defined as one surface or upper surface, and another surface on which the resistor 30 is not provided is defined as the other surface or lower surface. However, the strain gauge 1 can be used upside down, or can be arranged at any angle. Also, a plan view refers to viewing an object from the normal direction of the upper surface 10a of the substrate 10, and a planar shape refers to a shape of an object viewed from the normal direction of the upper surface 10a of the substrate 10.

The substrate 10 is a member serving as a base layer for forming the resistor 30 and the like, and has flexibility. The thickness of the substrate 10 is not limited in particular and can be selected appropriately depending on the purpose; for example, the thickness can be approximately 5 μm to 500 μm. Especially, it is favorable that the thickness of the substrate 10 is between 5 μm and 200 μm from the viewpoint of the transmission of strain from the surface of the strain generator joined to the lower surface of the substrate 10 via an adhesive layer or the like, and the dimensional stability with respect to the environment; and it is more favorable that the thickness is greater than or equal to 10 μm from the viewpoint of insulation.

The substrate 10 can be formed from an insulating resin film, for example, PI (polyimide) resin, epoxy resin, PEEK (polyether ether ketone) resin, PEN (polyethylene naphthalate) resin, PET (polyethylene terephthalate) resin, PPS (polyphenylene sulfide) resin, polyolefin resin, or the like. Note that a film refers to a member having a thickness of approximately less than or equal to 500 μm and having flexibility.

Here, "formed from an insulating resin film" does not preclude a substrate 10 from containing fillers, impurities, and the like in the insulating resin film. The substrate 10 may be formed from, for example, an insulating resin film containing a filler such as silica or alumina.

The resistor 30 is a thin film formed on the substrate 10 to have a predetermined pattern, which is a sensing part in which a resistance change is generated in response to a strain. The resistor 30 may be formed directly on the upper surface 10a of the substrate 10, or may be formed on the upper surface 10a of the substrate 10 via another layer. Note that in FIG. 1, the resistor 30 is illustrated in a dot pattern for the sake of convenience.

The resistor 30 can be formed from, for example, a material containing Cr (chromium), a material containing Ni (nickel), or a material containing both Cr and Ni. In other words, the resistor 30 can be formed from a material containing at least one of Cr and Ni. As an example of the material containing Cr, for example, a Cr composite film may be cited. As an example of the material containing Ni, for example, Cu—Ni (copper-nickel) may be cited. As a material containing both Cr and Ni, for example, Ni—Cr (nickel-chrome) may be cited.

Here, the Cr composite film is a film in which Cr, CrN, $Cr_2N$, and the like are mixed. The Cr composite film may contain unavoidable impurities such as chromium oxide.

The thickness of the resistor 30 is not limited in particular and can be selected appropriately depending on the purpose; for example, the thickness can be approximately 0.05 μm to 2 μm. Especially, it is favorable that the thickness of the resistor 30 is greater than or equal to 0.1 μm because the crystallinity of crystals constituting the resistor 30 (e.g., the crystallinity of α-Cr) improves, and it is further favorable that the thickness is less than or equal to 1 μm because cracks in the film and/or the warp from the substrate 10 due to the internal stress of the film constituting the resistor 30 can be reduced.

For example, in the case of the resistor 30 being a Cr composite film, the stability of the gauge characteristics can be improved by using α-Cr (alpha chromium), which is a stable crystal phase, as the main component. Also, by having the resistor 30 mainly constituted with α-Cr, the gauge factor of the strain gauge 1 can be greater than or equal to 10, and the temperature coefficient of gauge factor TCS and the temperature coefficient of resistance TCR can be fallen within a range of −1000 ppm/° C. to +1000 ppm/° C. Here, the main component means that a substance accounts for greater than or equal to 50 mass % among all substances constituting the resistor; from the viewpoint of improving the gauge characteristics, it is favorable that the resistor 30 contains α-Cr by greater than or equal to 80 wt %. Note that α-Cr is Cr having a bcc structure (body-centered cubic lattice structure).

Figure 3:
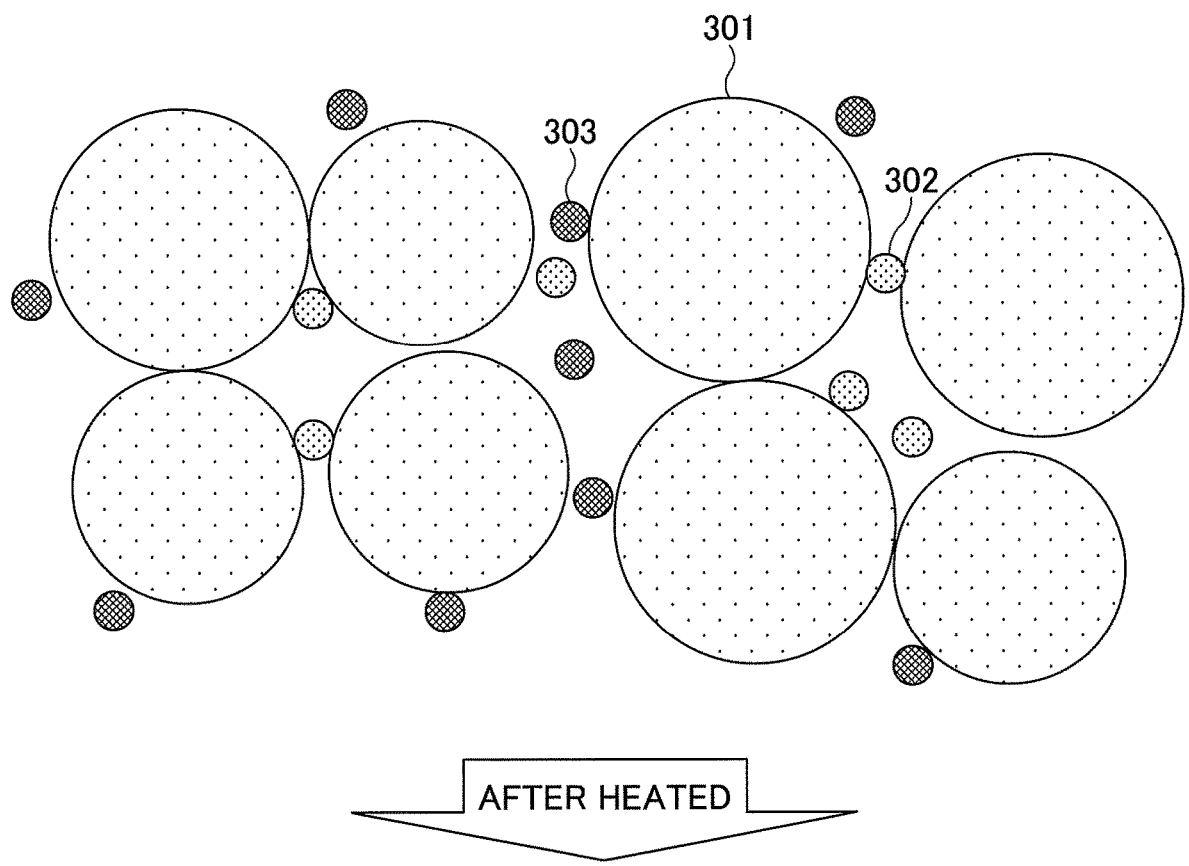
FIG. 3 is a first schematic view illustrating the inside of a resistor in the case where the resistor is a Cr composite film.
Figure 3:
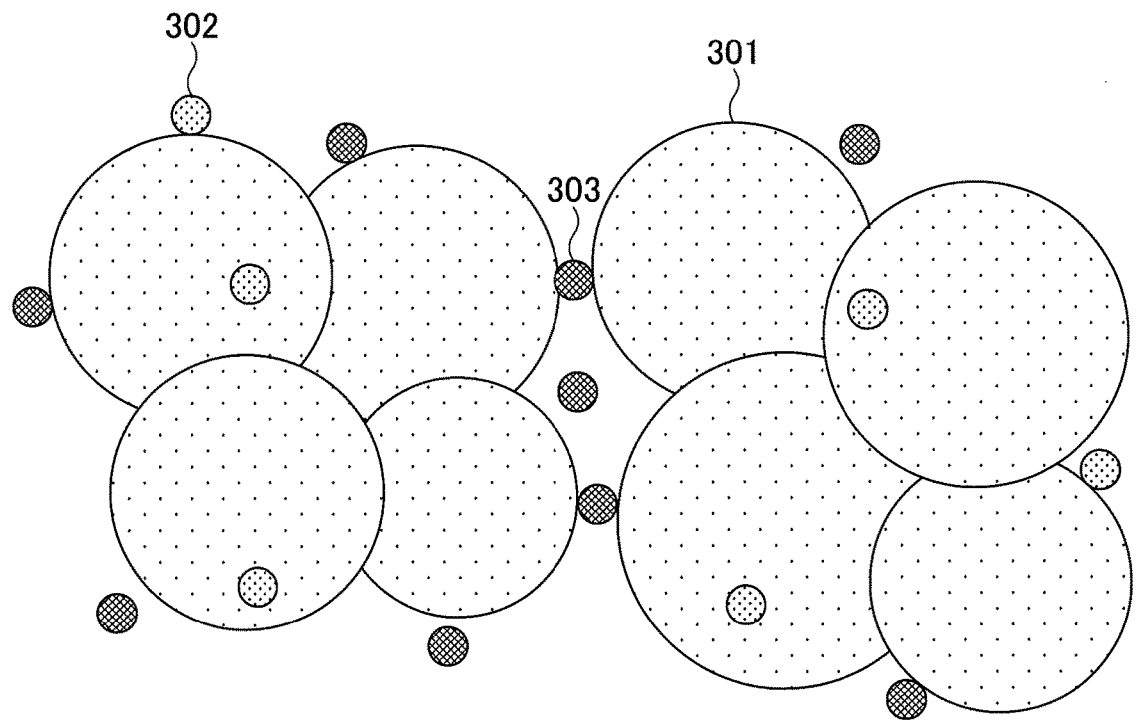

FIG. 3 is a schematic view illustrating the inside of a resistor in the case where the resistor is a Cr composite film, which schematically illustrates states before and after heating. As illustrated in FIG. 3, the resistor 30 as a Cr composite film includes α-Cr crystal grains 301 and chromium nitride 302 (one or both of CrN and Cr2N); and in the present embodiment, a substance 303 is further added.

In a Cr composite film to which the substance 303 is not added, the TCR changes greatly by heating, and a longer heating time makes the TCR greater in the positive direction. This is because the crystal grains of Cr as a positive component of TCR gradually grow by heating, and the chromium nitride as a negative component of TCR present in the crystal grain boundaries is taken into the Cr film or pushed out to the outside, and thereby, the chromium nitride present in the crystal grain boundaries becomes reduced. Therefore, as the heating time becomes longer, the TCR continues to increase to be a greater positive value.

Thereupon, in the present embodiment, a substance 303 that controls the growth of α-Cr crystal grains 301 is added to the Cr composite film, and the substance 303 is dispersed in the Cr composite film.

The substance 303 is not limited in particular and can be selected appropriately depending on the purpose as long as being a substance that has a function of controlling the growth of α-Cr crystal grains 301. It is favorable that the substance 303 has a TCR of greater than or equal to −30000 ppm/° C. and less than or equal to +1000 ppm/° C., and an electric conductivity of greater than $10^{-6}$ S/m and less than or equal to $10^7$ S/m; for example, a metal compound such as TiN, TaN, SiTiN, or CrSiO, or a semiconductor such as Si may be listed. Multiple species of substances selected from among these may be mixed.

Here, the reason why the TCR is favorably greater than or equal to −30000 ppm/° C. and less than or equal to +1000 ppm/° C. is as follows. For example, in the case where a substance having a TCR greater than +1000 ppm/° C. is present in the crystal grain boundaries, the behavior as a conductor becomes dominant; therefore, the TCR value of the entire film becomes greater than +1000 ppm/° C. Also, in the case where a substance having a TCR smaller than −30000 ppm/° C. is present in the crystal grain boundaries, due to the contribution of thermally activated hopping conduction caused by structural defects, the TCR value becomes unstable. In contrast, in the case where a substance 303 having a TCR of greater than or equal to −30000 ppm/° C. and less than or equal to +1000 ppm/° C. is present in the crystal grain boundaries, the problems described above do not occur; therefore, it is possible to stably control the TCR of the entire Cr composite film to a low value.

Also, the reason why the electric conductivity is favorably greater than $10^{-6}$ S/m and less than or equal to $10^7$ S/m is as follows. For example, in the case of adding a metal as a substance whose electric conductivity is greater than $10^7$ S/m to a Cr composite film, the TCR changes significantly because the metal diffuses into the Cr composite film by heating. Also, in the case of adding a substance of less than or equal to $10^{-6}$ S/m, it is not possible to control the electric properties in the Cr composite film because it hardly conducts electricity. On the other hand, in the case of adding the substance 303 having an electric conductivity of greater than $10^{-6}$ S/m and less than or equal to $10^7$ S/m to the Cr composite film, diffusion can be controlled unlike a metal; in addition, a material having electrical characteristics in accordance with the characteristics of the Cr composite film can be added; therefore, the TCR can be maintained to be a low value both before and after the heating.

The amount of the substance 303 to be added can be appropriately selected depending on the film-forming conditions of the resistor 30, and can be 1 to 25 wt %. It is particularly favorable that the added amount of the substance 303 in the resistor 30 is 2 to 10 wt % because the crystallinity of α-Cr is improved.

By adding the substance 303, which has a function of controlling the growth of α-Cr crystal grains 301, to the resistor 30 as a Cr composite film, it is possible to prevent the TCR from continuously increasing as a positive value due to heating, and to control the TCR to be a low value. In other words, it is possible to further improve the stability of the TCR of the strain gauge 1. Note that depending on the amount of the substance 303 added to the Cr composite film, it is possible to control the growth rate of α-Cr crystal grains 301, and consequently, to control the TCR of the strain gauge 1.

As above, although the description has been made taking a Cr composite film as an example, the same effects as in the case of the Cr composite film can be obtained in the case of a Cu—Ni thin film or a Ni—Cr thin film, by adding to the resistor a substance that has a function of controlling growth of crystal grains as the main component of the resistor.

Referring back to FIGS. 1 and 2, the terminal section 41 extends from both ends of the resistor 30, and is formed in a substantially rectangular shape having a wider width than the resistor 30 in plan view. The terminal sections 41 are a pair of electrodes for outputting to the outside a change in the resistance value of the resistor 30 caused by a strain, to which, for example, lead wires or the like for external connection are joined. The resistor 30 extends, for example, in a zigzag way from one of the terminal sections 41 and is connected to the other of the terminal sections 41. The upper surfaces of the terminal sections 41 may be covered with a metal having better solderability than the terminal sections 41. Note that although different numerals are used for the resistor 30 and the terminal sections 41 for the sake of convenience, these may be integrally formed of the same material in the same process.

A cover layer 60 (an insulating resin layer) may be provided on the substrate 10, so as to cover the resistor 30. By providing the cover layer 60, it is possible to prevent mechanical damage and the like from occurring in the resistor 30. Also, by providing the cover layer 60, it is possible to protect the resistor 30 from moisture and the like. Note that the cover layer 60 may be provided so as to cover the entire part excluding the terminal sections 41.

The cover layer 60 can be formed from an insulating resin; for example, PI resin, epoxy resin, PEEK resin, PEN resin, PET resin, PPS resin, composite resin (e.g., silicone resin, polyolefin resin), or the like. The cover layer 60 may contain a filler or a pigment. The thickness of the cover layer 60 is not limited in particular and can be selected appropriately depending on the purpose; for example, the thickness can be approximately 2 µm to 30 µm.

In order to manufacture a strain gauge 1, first, a substrate 10 is prepared, and a planar resistor 30 and a terminal sections 41 as illustrated in FIG. 1 are formed on the upper surface 10a of the substrate 10. The material and thickness of the resistor 30 and the terminal sections 41 are as described above. The resistor 30 and the terminal sections 41 can be integrally formed of the same material.

The resistor 30 and the terminal sections 41 can be formed by, for example, forming a film by a magnetron sputtering method using a material capable of forming the resistor 30 and the terminal sections 41 as a target; and patterning the formed film by photolithography. The resistor 30 and the terminal sections 41 may be formed using a reactive sputtering method, an evaporation method, an arc ion plating method, a pulse laser deposition method, or the like instead of the magnetron sputtering method.

From the viewpoint of stabilizing the gauge characteristics, before forming the resistor 30 and the terminal sections 41 as a film, as an underlayer, it is favorable to form in vacuum a functional layer having a thickness of approximately 1 nm to 100 nm on the upper surface 10a of the substrate 10 by, for example, a conventional sputtering method. Note that after having the resistor 30 and the terminal sections 41 formed on the entire upper surface of the functional layer, the functional layer is patterned by photolithography together with the resistor 30 and the terminal sections 41 into a planar shape as illustrated in FIG. 1.

In the present application, the functional layer refers to a layer having a function of promoting crystal growth of at least the resistor 30 as the upper layer. It is favorable that the functional layer further has a function of preventing oxidation of the resistor 30 due to oxygen and moisture contained in the substrate 10, and a function of improving the adhesion between the substrate 10 and the resistor 30. The functional layer may further have other functions.

The insulating resin film constituting the substrate 10 contains oxygen and moisture, and thereby, especially when the resistor 30 contains Cr, Cr forms a self-oxidized film; therefore, it is effective that the functional layer has a function of preventing oxidation of the resistor 30.

The material of the functional layer is not limited in particular as long as it has a function of promoting crystal growth of at least the resistor 30 as the upper layer, and can be appropriately selected depending on the purpose; as the material, one or more species of metals selected from among a group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any of the metals in this group; or a compound of any of the metals in this group may be listed.

As examples of the alloys described above, FeCr, TiAl, FeNi, NiCr, CrCu, and the like may be listed. Also, as examples of the compounds described above, TiN, TaN, $Si_3N_4$, $TiO_2$, $Ta_2O_5$, $SiO_2$, and the like may be listed.

The functional layer can be formed by, for example, a conventional sputtering method using a material capable of forming the functional layer as a target, and introducing Ar (argon) gas into the chamber. By using the conventional sputtering method, the functional layer is formed as a film while the upper surface 10a of the substrate 10 is being etched with Ar; therefore, the effect of improving the adhesion can be obtained by minimizing the amount of the functional layer formed as a film.

However, this is an example of the method of forming a functional layer as a film, and the functional layer may be formed by another method. For example, a method may be used in which the upper surface 10a of the substrate 10 is activated by plasma treatment using Ar or the like before forming the functional layer so as to obtain an adhesion improving effect, and then, the functional layer is formed in vacuum as a film by a magnetron sputtering method.

The combination of the material of the functional layer and the material of the resistor 30 and the terminal sections 41 is not limited in particular and can be appropriately selected depending on the purpose; for example, it is possible to use Ti as the functional layer, and to form a Cr composite film containing α-Cr (alpha chromium) as the main component, as the resistor 30 and the terminal sections 41.

In this case, for example, the resistor 30 and the terminal sections 41 can be formed as a film by a magnetron sputtering method using a material capable of forming a Cr composite film as a target, and introducing Ar gas into the chamber. Alternatively, the resistor 30 and the terminal sections 41 may be formed as a film by a reactive sputtering method using pure Cr as a target, and introducing an appropriate amount of nitrogen gas together with Ar gas into the chamber.

In these methods, a growth face of the Cr mixed-phase film is defined and triggered by the functional layer formed of Ti, which enables to form a Cr composite film containing, as the main component, α-Cr having a stable crystal structure. Also, the gauge characteristics are improved by Ti constituting the functional layer diffusing into the Cr composite film. For example, the gauge factor of the strain gauge 1 can be greater than or equal to 10, and the temperature coefficient of gauge factor TCS and the temperature coefficient of resistance TCR can be fallen within a range of −1000 ppm/° C. to +1000 ppm/° C. Note that in the case of forming the functional layer from Ti, the Cr composite film may contain Ti or TiN. In other words, it is possible to add TiN to a Cr composite film from a functional layer made of Ti.

Note that in the case where the resistor 30 is a Cr composite film, the functional layer made of Ti has all of the function of promoting the crystal growth of the resistor 30; the function of preventing oxidation of the resistor 30 due to oxygen and moisture contained in the substrate 10; and the function of improving the adhesion between the substrate 10 and the resistor 30. The same applies in the case of using Ta, Si, Al, or Fe instead of Ti as the functional layer.

In this way, by providing a functional layer as an underlayer of the resistor 30, the crystal growth of the resistor 30 can be promoted, and the resistor 30 having a stable crystal phase can be manufactured. As a result, the stability of the gauge characteristics of the strain gauge 1 can be improved. Also, by diffusing the material constituting the functional layer into the resistor 30, the gauge characteristics of the strain gauge 1 can be improved.

Also, in order to form a Cr composite film having TiN added, a resistor 30 and terminal sections 41 may be formed as a film by a reactive sputtering method using Cr and Ti as respective targets, and introducing an appropriate amount of nitrogen gas together with Ar gas into the chamber. In this case, Ti is formed as TiN in the Cr composite film, and thus, a Cr composite film having TiN added can be formed.

Note that in this method, by forming a Cr composite film on a functional layer other than Ti, a Cr composite film having TiN added can be formed. Also, in this method, by forming a Cr composite film directly on the upper surface 10a of the substrate 10, without having formed a functional layer, a Cr composite film having TiN added can be formed.

After having the resistor 30 and the terminal sections 41 formed, if necessary, by providing a cover layer 60 on the upper surface 10a of the substrate 10, so as to cover the resistor 30 and to expose the terminal sections 41, the strain gauge 1 is completed. The cover layer 60 can be manufactured, for example, by laminating a thermosetting insulating resin film in a semi-cured state on the upper surface 10a of the substrate 10, so as to cover the resistor 30 and to expose the terminal sections 41, and heating the laminated film to be cured. The cover layer 60 may also be manufactured by applying a liquid or paste-like thermosetting insulating resin to the upper surface 10a of the substrate 10, so as to cover the resistor 30 and to expose the terminal sections 41, and heating the resin to be cured.

Figure 4:
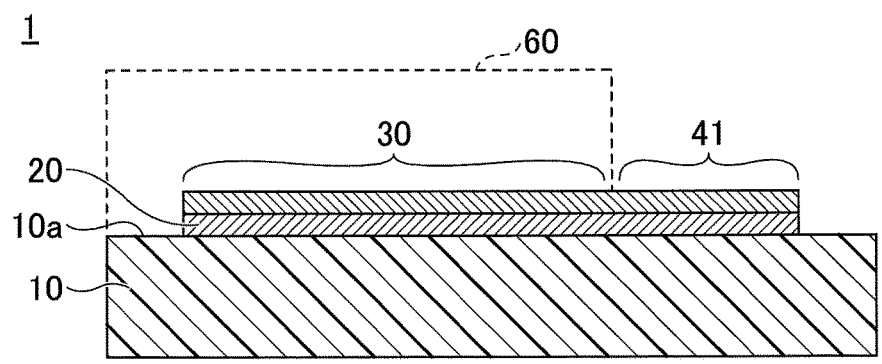
FIG. 4 is a second cross-sectional view illustrating a strain gauge according to the first embodiment.

Note that in the case of providing the functional layer on the upper surface 10a of the substrate 10 as the underlayer of the resistor 30 and the terminal section 41, the strain gauge 1 has a cross-sectional shape illustrated in FIG. 4. A layer indicated by a reference numeral 20 is the functional layer. The planar shape of the strain gauge 1 in the case of providing the functional layer 20 is the same as that in FIG. 1.

Second Embodiment

In the second embodiment, an example will be described in which a substance having characteristics different from those of the first embodiment is added to the resistor. Note that in the second embodiment, description of the same components as those already described may be omitted.

Figure 5:
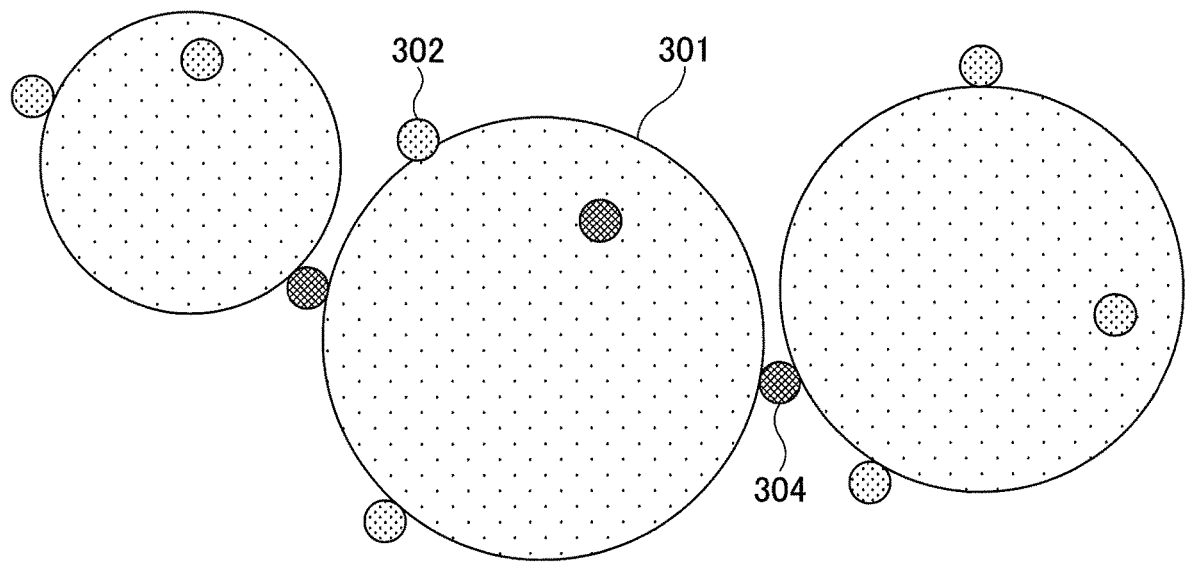
FIG. 5 is a second schematic view illustrating the inside of a resistor in the case where the resistor is a Cr composite film.

FIG. 5 is a schematic view illustrating the inside of a resistor in the case where the resistor is a Cr composite film. As illustrated in FIG. 5, the resistor 30 as a Cr composite film includes α-Cr crystal grains 301 and chromium nitride 302 (one or both of CrN and Cr2N); in the present embodiment, a substance 304 is further added.

The TCR of the Cr composite film before heating to which the substance 304 is not added exhibits a negative value. This is because although the crystal grains of Cr are a positive component of TCR, for example, due to the film formation in a nitrogen atmosphere, chromium nitride (one or both of CrN and Cr2N) as a negative component of TCR is formed in the crystal grain boundaries of Cr, and the effect of chromium nitride as a negative component of TCR becomes apparent noticeably.

In a Cr composite film to which the substance 304 is not added, the TCR changes greatly by heating, and the TCR of Cr composite film exhibits a low value. This is because residual stress in the Cr composite film is alleviated, the crystal grains of Cr come closer to each other, and thereby, the tunnel current in the crystal grain boundaries becomes greater, and the effect of chromium nitride as a negative component of TCR is reduced.

In the present embodiment, the substance 304 that has a function of preventing α-Cr crystal grains 301 from cohering is added to the Cr composite film, and the substance 304 is dispersed in the Cr composite film and present in the crystal grain boundaries of the α-Cr crystal grains 301.

The substance 304 is not limited in particular and can be selected appropriately depending on the purpose as long as being a substance that has a function of preventing α-Cr crystal grains 301 from cohering. It is favorable that the substance 304 has a TCR of greater than or equal to −30000 ppm/° C. and less than or equal to +1000 ppm/° C., and an electric conductivity of less than or equal to $10^{-6}$ S/m; for example, an insulator such as AlN, BN, $TiO_2$, $ZrO_2$, $SiO_2$, or $Si_3N_4$ may be listed. Multiple species of substances selected from among these may be mixed.

Here, the reason why the TCR is favorably greater than or equal to −30000 ppm/° C. and less than or equal to +1000 ppm/° C. is as follows. For example, in the case where a substance having a TCR greater than +1000 ppm/° C. is present in the crystal grain boundaries, the behavior as a conductor becomes dominant; therefore, the TCR value of the entire film becomes greater than +1000 ppm/° C. Also, in the case where a substance having a TCR smaller than −30000 ppm/° C. is present in the crystal grain boundaries, due to the contribution of thermally activated hopping conduction caused by structural defects, the TCR value becomes unstable. In contrast, in the case where a substance 304 having a TCR of greater than or equal to −30000 ppm/° C. and less than or equal to +1000 ppm/° C. is present in the crystal grain boundaries, the problems described above do not occur; therefore, it is possible to stably control the TCR of the entire Cr composite film to a low value.

Also, the reason why the electric conductivity is favorably less than or equal to $10^{-6}$ S/m is as follows. For example, in the case of adding a metal as a substance whose electric conductivity is greater than $10^7$ S/m to a Cr composite film, the TCR changes significantly because the metal diffuses into the Cr composite film by heating. Also, in the case of adding a metal compound having higher electrical properties than an insulator, as a substance having an electrical conductivity of greater than $10^{-6}$ S/m and less than or equal to $10^7$ S/m in a Cr composite film, unlike metal, diffusion can be controlled, but changes in the electrical characteristics of the Cr composite are induced. In contrast, in the case of adding the substance 304 having an electrical conductivity of less than or equal to $10^{-6}$ S/m in a Cr composite film, unlike metal, diffusion is controlled, and the distance between Cr particles can be controlled; therefore, the TCR can be maintained to have a low value both before and after heating.

The amount of the substance 304 to be added can be appropriately selected depending on the film-forming conditions of the resistor 30, which can be 1 to 25 wt %. It is particularly favorable that the added amount of the substance 304 in the resistor 30 is 2 to 10 wt % because the crystallinity of α-Cr is improved.

By adding a substance 304, which has a function of preventing α-Cr crystal grains 301 from cohering, to the resistor 30 as a Cr composite film so as to have the substance 304 present in the crystal grain boundaries, it is possible to control cohesion between crystal grains of Cr as a positive component of TCR, and to lower the TCR of the strain gauge.

In other words, the substance 304 present in the crystal grain boundaries prevents the α-Cr crystal grains 301 from cohering due to alleviation of residual stress during heating; therefore, even after the heating, the state inside the resistor 30 is not significantly different from the state before the heating, and thereby, the TCR of the strain gauge 1 can be maintained at a low value.

As a result, it is possible to maintain the TCR of the Cr composite film at a low value both before and after the heating, and to control the change in the TCR before and after the heating. In other words, it is possible to further improve the stability of the TCR of the strain gauge 1. Note that depending on the amount of substance 304 added to the Cr composite film, it is possible to control the degree of proximity between α-Cr crystal grains 301, and consequently, to control the TCR of the strain gauge 1.

In order to form a Cr composite film to which AlN is added, for example, a functional layer made of Al is formed as a film on the upper surface 10a of the substrate 10. Then, the resistor 30 and the terminal sections 41 can be formed as a film by a magnetron sputtering method using a raw material capable of forming a Cr composite film as a target and introducing Ar gas into the chamber. Alternatively, the resistor 30 and the terminal sections 41 may be formed as a film by a reactive sputtering method using pure Cr as a target, and introducing an appropriate amount of nitrogen gas together with Ar gas into the chamber.

In these methods, a growth face of the Cr mixed-phase film is defined and triggered by the functional layer formed of Al, which enables to form a Cr composite film containing, as the main component, α-Cr having a stable crystal structure. Also, the gauge characteristics are improved by Al constituting the functional layer diffusing into the Cr composite film. For example, the gauge factor of the strain gauge 1 can be greater than or equal to 10, and the temperature coefficient of gauge factor TCS and the temperature coefficient of resistance TCR can be fallen within a range of −1000 ppm/° C. to +1000 ppm/° C. Note that in the case of forming the functional layer from Al, the Cr composite film may contain Al or AlN. In other words, it is possible to add AlN to a Cr composite film from a functional layer made of Al.

Also, in order to form a Cr composite film having AlN added, a resistor 30 and terminal sections 41 may be formed as a film by a reactive sputtering method using Cr and Al as respective targets, and introducing an appropriate amount of nitrogen gas together with Ar gas into the chamber. In this case, Al is formed as AlN in the Cr composite film, and thus, a Cr composite film having AlN added can be formed.

Note that in this method, by forming a Cr composite film on a functional layer other than Al, a Cr composite film having AlN added can be formed. Also, in this method, by forming a Cr composite film directly on the upper surface 10a of the substrate 10, without having formed a functional layer, a Cr composite film having AlN added can be formed.

The first embodiment and the second embodiment can be combined. For example, in the case of the resistor 30 being a Cr composite film, it is possible to add TiN as the substance 303 and AlN as the substance 304 to the resistor 30. This enables to obtain both of the effects described in the first embodiment and in the second embodiment.

As above, although the description has been made taking a Cr composite film as an example, the same effects as in the case of the Cr composite film can be obtained in the case of a Cu—Ni thin film or a Ni—Cr thin film, by adding to the resistor a substance that has a function of preventing crystal grains as the main component of the resistor from cohering.

Third Embodiment

In the third embodiment, an example will be described in which the stability of the TCR of a strain gauge is improved by a method different from those of the first and second embodiments. Note that in the third embodiment, description of the same components as those already described may be omitted.

Figure 6:
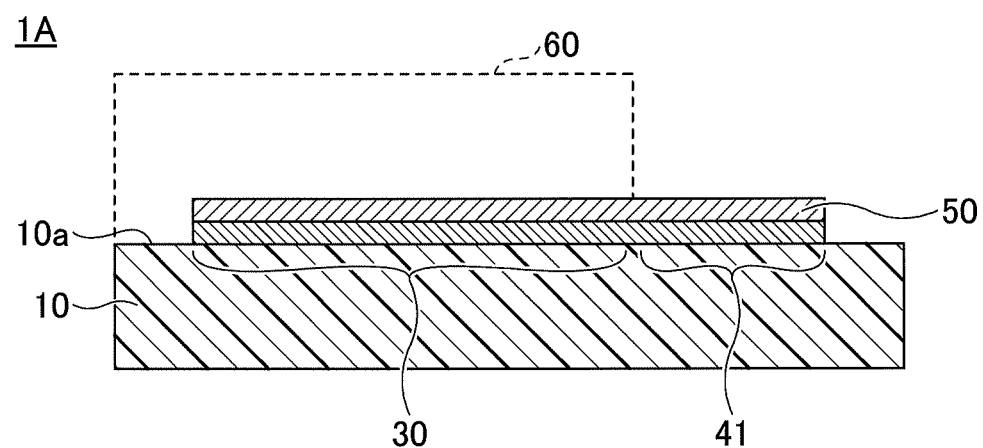
FIG. 6 is a cross-sectional view illustrating a strain gauge according to a third embodiment.

FIG. 6 is a cross-sectional view illustrating a strain gauge according to the third embodiment, which illustrates a cross section corresponding to FIG. 2. Referring to FIG. 6, a strain gauge 1A is provided with an oxidation impeding layer 50 on the upper surfaces of the resistor 30 and the terminal sections 41, and in this regard, differs from the strain gauge 1 (see FIGS. 1 and 2).

The resistance value and the gauge factor of a thin film containing Cr as a base depend on the oxidation state. Therefore, the oxidation control of Cr is important; however, the oxide layer of Cr easily forms an oxide layer as generally called a passive layer, and thereby, it is difficult to control the oxidation. Thereupon, in the present embodiment, as illustrated in FIG. 6, the oxidation impeding layer 50 is provided on the upper surfaces of the resistor 30 and the terminal sections 41. However, depending on the conductivity of the oxidation impeding layer 50, the oxidation impeding layer 50 on the upper surfaces of the terminal sections 41 may be removed.

The material of the oxidation impeding layer 50 is not limited in particular as long as being capable of preventing oxidation of the resistor 30, and can be selected appropriately depending on the purpose; Ti, TiN, TaN, $Si_3O_4$, Si, $SiO_2$, $ZrO_2$, or the like may be listed. Multiple species of substances selected from among these may be mixed.

For example, in the case of the resistor 30 being a Cr composite film, and the material of the oxidation impeding layer 50 being Ti, it is favorable that the thickness of the oxidation impeding layer 50 is approximately 1 nm to 100 nm, from the viewpoint of reducing the influence on the gauge characteristics of the Cr composite film. Also, in the case of the resistor 30 being a Cr composite film, and the material of the oxidation impeding layer 50 being TiN, it is favorable that the thickness of the oxidation impeding layer 50 is approximately 1 nm to 10 nm, from the viewpoint of improving the stability of TCR of the Cr composite film.

In order to form an oxidation impeding layer 50 on the upper surfaces of the resistor 30 and the terminal sections 41, after having the resistor 30 and the terminal sections 41 formed, a film is formed in vacuum on the entire upper surfaces of the resistor 30 and the terminal sections 41, for example, by a conventional sputtering method using a raw material that is capable of forming an oxidation impeding layer 50 as a target, and introducing Ar (argon) gas into the chamber. Thereafter, the resistor 30, the terminal sections 41, and the oxidation impeding layer 50 are patterned into a planar shape as illustrated in FIG. 1. Thereafter, if necessary, the oxidation impeding layer 50 on the upper surfaces of the terminal sections 41 is removed.

By performing the film formation of the resistor 30 and the terminal sections 41, and the film formation of the oxidation impeding layer 50 as a series of steps in a vacuum chamber, it is possible to form the oxidation impeding layer 50 directly on the upper surface of the resistor 30, without forming an oxide layer on the upper surfaces of the resistor 30 and the terminal sections 41. In other words, it is possible to form an oxidation impeding layer 50 on a non-oxidized surface, which corresponds to the upper surfaces of the resistor 30 and the terminal sections 41.

Note that although the patterning causes the side surfaces of the resistor 30 and the terminal sections 41 to be exposed from the oxidation impeding layer 50, the resistor 30 and the terminal sections 41 are thin, and the area of the side surfaces is small; therefore, oxidation from the side surfaces does not pose a problem.

In this way, by forming an oxidation impeding layer 50 as a film on the non-oxidized surface corresponding to the upper surface of the resistor 30, even in the case of the resistor 30 being a thin film containing Cr as a base, the resistor 30 is not oxidized; therefore, it is possible to improve the stability of the resistance value of the resistor 30 and the gauge factor of the strain gauge 1A. Also, it is possible to further improve the stability of the TCR of the strain gauge 1A.

Note that as in the first and second embodiments, it is favorable to provide a functional layer as an underlayer of the resistor 30. In the present embodiment, as the functional layer, it is favorable to use a layer that has a function of promoting the crystal growth of the resistor 30 as the upper layer, and a function of preventing oxidation of the resistor 30 due to oxygen and moisture contained in the substrate 10.

This enables to promote the crystal growth of the resistor 30, to manufacture the resistor 30 having a stable crystal phase, and to improve the stability of the gauge characteristics. Also, diffusing the material forming the functional layer into the resistor 30 enables to improve the gauge characteristics. Furthermore, the functional layer serves as a barrier layer to control oxidation of the resistor 30 from the substrate 10 side; therefore, it is possible to further improve the stability of the resistance value of the resistor 30 and the gauge factor of the strain gauge 1A. In addition, it is possible to further improve the stability of the TCR of the strain gauge 1A.

For example, in the case of the resistor 30 being a Cr composite film, as the functional layer having a function of promoting crystal growth and a function of serving as a barrier layer, Ti and TiN may be listed, and it is particularly favorable to use TiN. The reason why is as follows: diffusing Ti into a Cr-composite film improves the gauge characteristics, but causes variations in the gauge characteristics depending on the degree of diffusion; however, in the case of diffusing TiN into a Cr composite film, the degree of diffusion in the Cr composite film is smaller; therefore, variations in the gauge characteristics depending on the degree of diffusion are less likely to occur, and thereby, the stability of the gauge characteristics depending on the temperature is improved.

The first embodiment and the third embodiment can be combined. For example, in the case of the resistor 30 being a Cr composite film, it is possible to add TiN as the substance 303 to the resistor 30, and to form a film of Ti on the upper surface of the resistor 30 as an oxidation impeding layer 50. Furthermore, a functional layer of TiN or the like having a function of promoting crystal growth of the resistor 30 and a function of preventing oxidation of the resistor 30 may be provided as an underlayer of the resistor 30. This enables to obtain both of the effects described in the first embodiment and in the second embodiment.

Also, the second embodiment and the third embodiment can be combined. For example, in the case of the resistor 30 being a Cr composite film, it is possible to add AlN as the substance 304 to the resistor 30, and to form a film of Ti on the upper surface of the resistor 30 as an oxidation impeding layer 50. Furthermore, a functional layer of TiN or the like having a function of promoting crystal growth of the resistor 30 and a function of preventing oxidation of the resistor 30 may be provided as an underlayer of the resistor 30. This enables to obtain both of the effects described in the second embodiment and in the third embodiment.

Also, the first embodiment, the second embodiment, and the third embodiment can be combined. For example, in the case of the resistor 30 being a Cr composite film, it is possible to add TiN as the substance 303 and AlN as the substance 304 to the resistor 30, and to form a film of Ti on the upper surface of the resistor 30 as an oxidation impeding layer 50. Furthermore, a functional layer of TiN or the like having a function of promoting crystal growth of the resistor 30 and a function of preventing oxidation of the resistor 30 may be provided as an underlayer of the resistor 30. This enables to obtain all of the effects described in the first embodiment, the second embodiment, and the third embodiment.

As above, although the description has been made taking a thin film containing Cr as a base as an example, the same effects as in the case of the thin film containing Cr as a base can be obtained in the case of a Cu—Ni thin film or a Ni—Cr thin film, by providing an oxidation impeding layer 50 on the upper surface of the resistor 30. Also, for a Cu—Ni thin film and a Ni—Cr thin film, by providing, as an underlayer of the resistor 30, a functional layer having a function of promoting crystal growth and a function of serving as a barrier layer, the same effects as in the case of the thin film containing Cr as a base can be obtained.

As above, the preferred embodiments and the like have been described in detail; note that the present invention is not limited to the embodiments described above and the like, and various modifications and substitutions can be made to the embodiments and the like described above without departing from the scope described in the claims.

The present international application claims priority based on Japanese Patent Application No. 2017-210573 filed on Oct. 31, 2017, and the entire contents of Japanese Patent Application No. 2017-210573 are incorporated herein by reference.

DESCRIPTION OF REFERENCE CODES 1, 1A strain gauge
10 substrate
10a upper surface
20 functional layer
30 resistor
41 terminal section
50 oxidation impeding layer
60 cover layer
301 α-Cr crystal grain
302 chromium nitride
303, 304 substance

The invention claimed is:

1. A strain gauge comprising;
a substrate formed of resin and having flexibility;
a functional layer formed from a metal, an alloy, or a metal compound, directly on one surface of the substrate; and
a resistor formed as a film that contains Cr, CrN, and $Cr_2N$ and into which the metal, the alloy, or the metal compound contained in the functional layer is diffused, the resistor being provided on one surface of the functional layer,
wherein a first substance having a function of controlling growth of crystal grains as a main component of the resistor, is added to the resistor.

2. The strain gauge as claimed in claim 1, wherein the functional layer contains one or more species of metals selected from among a group consisting of Cr, Ti, V, Nb, Ta, Ni, Y, Zr, Hf, Si, C, Zn, Cu, Bi, Fe, Mo, W, Ru, Rh, Re, Os, Ir, Pt, Pd, Ag, Au, Co, Mn, and Al; an alloy of any of the metals in the group; or a compound of any of the metals in the group.

3. The strain gauge as claimed in claim 2, wherein the functional layer contains one or more species of metals selected from among a group consisting of Cr, V, Nb, Ta, Ni, Y, Hf, C, Zn, Bi, Fe, Mo, W, Ru, Rh, Re, Os, Ir, Pt, Pd, Ag, Au, Co, and Mn; an alloy of any of the metals in the group; or a compound of any of the metals in the group.

4. The strain gauge as claimed in claim 2, wherein the functional layer contains one species of metal compound selected from among a group consisting of TiN, TaN, $Si_3N_4$, $TiO_2$, $Ta_2O_5$, and $SiO_2$.

5. The strain gauge as claimed in claim 4, wherein the functional layer contains one species of metal compound selected from among a group consisting of TiN, TaN, $Si_3N_4$, and $Ta_2O_5$.

6. The strain gauge as claimed in claim 2, wherein the functional layer contains one species of alloy selected from among a group consisting of FeCr, TiAl, FeNi, NiCr, and CrCu.

7. The strain gauge as claimed in claim 1, wherein the functional layer has a function of preventing oxidation of the resistor, a function of controlling movement of oxygen and moisture contained in the substrate toward the resistor, and/or a function of improving adhesion between the substrate and the resistor.

8. The strain gauge as claimed in claim 1, wherein the functional layer is patterned into a same planar shape as the resistor.

9. The strain gauge as claimed in claim 1, wherein a thickness of the functional layer is 1 nm to 100 nm.

10. The strain gauge as claimed in claim 1, wherein a second substance having a function of preventing crystal grains as a main component of the resistor from cohering, is added to the resistor.

11. The strain gauge as claimed in claim 1, further comprising:
an oxidation impeding layer formed to cover a non-oxidized surface corresponding to an upper surface of the resistor, and to expose a side surface of the resistor.

12. A strain gauge comprising:
a substrate formed of resin and having flexibility;
a functional layer formed from a metal, an alloy, or a metal compound, directly on one surface of the substrate; and
a resistor formed as a film that contains Cr, CrN, and $Cr_2N$ and into which the metal, the alloy, or the metal compound contained in the functional layer is diffused, the resistor being provided on one surface of the functional layer,
wherein a first substance having a function of controlling growth of crystal grains as a main component of the resistor, is added to the resistor.

* * * * *